June 14, 1938. A. J. BARNEBL 2,120,455
ROTARY FILTER
Filed Sept. 24, 1934 4 Sheets-Sheet 1
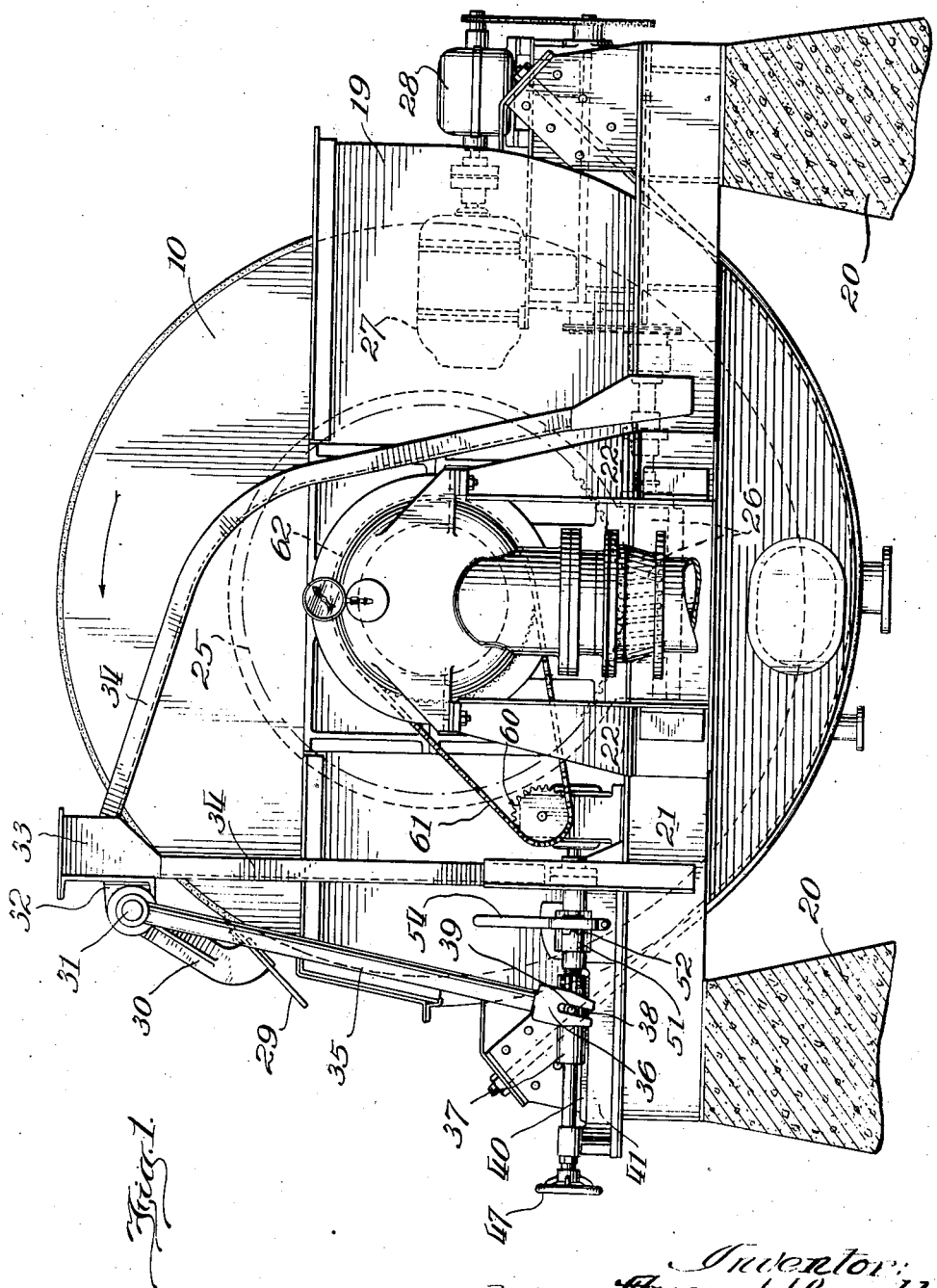

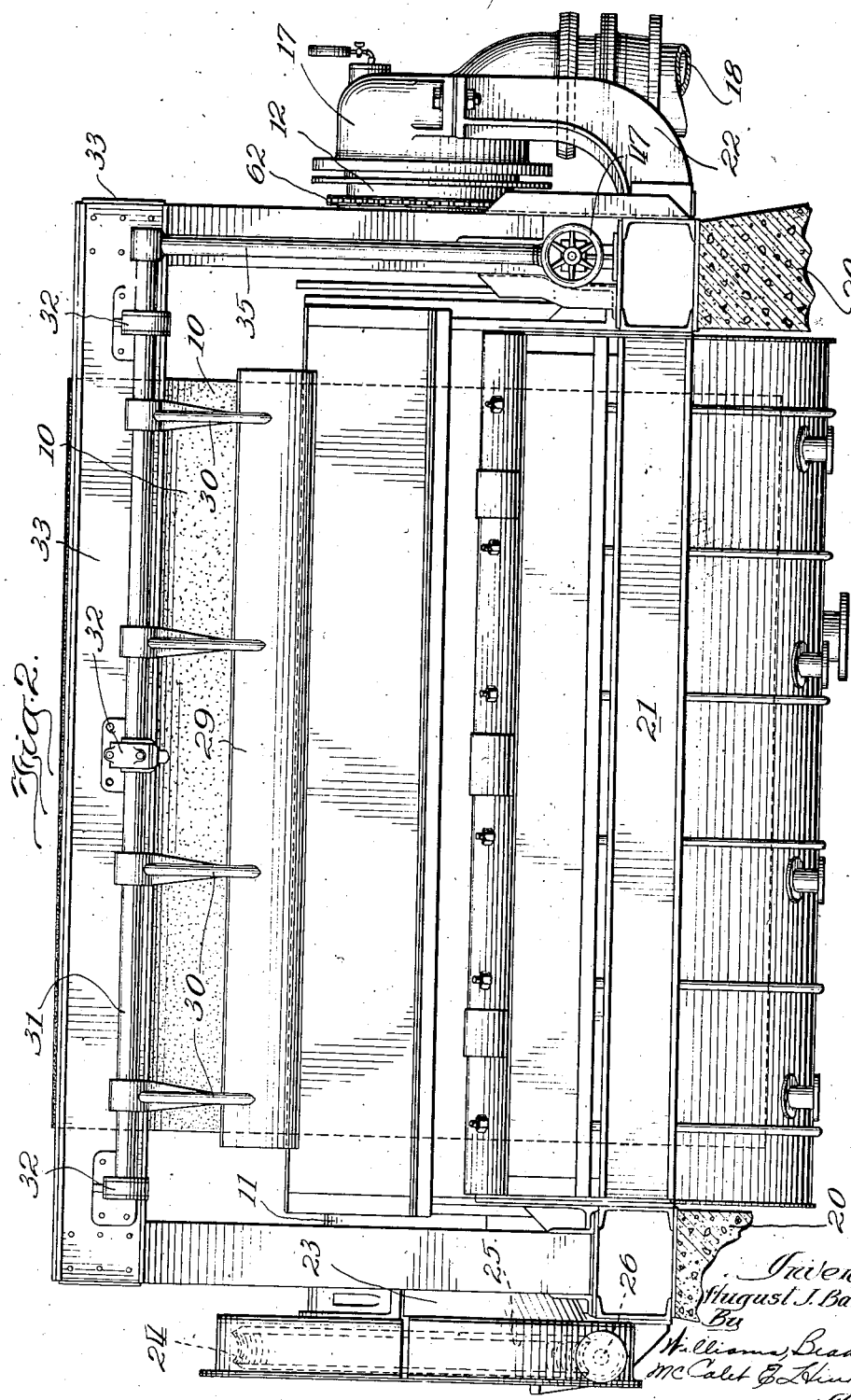

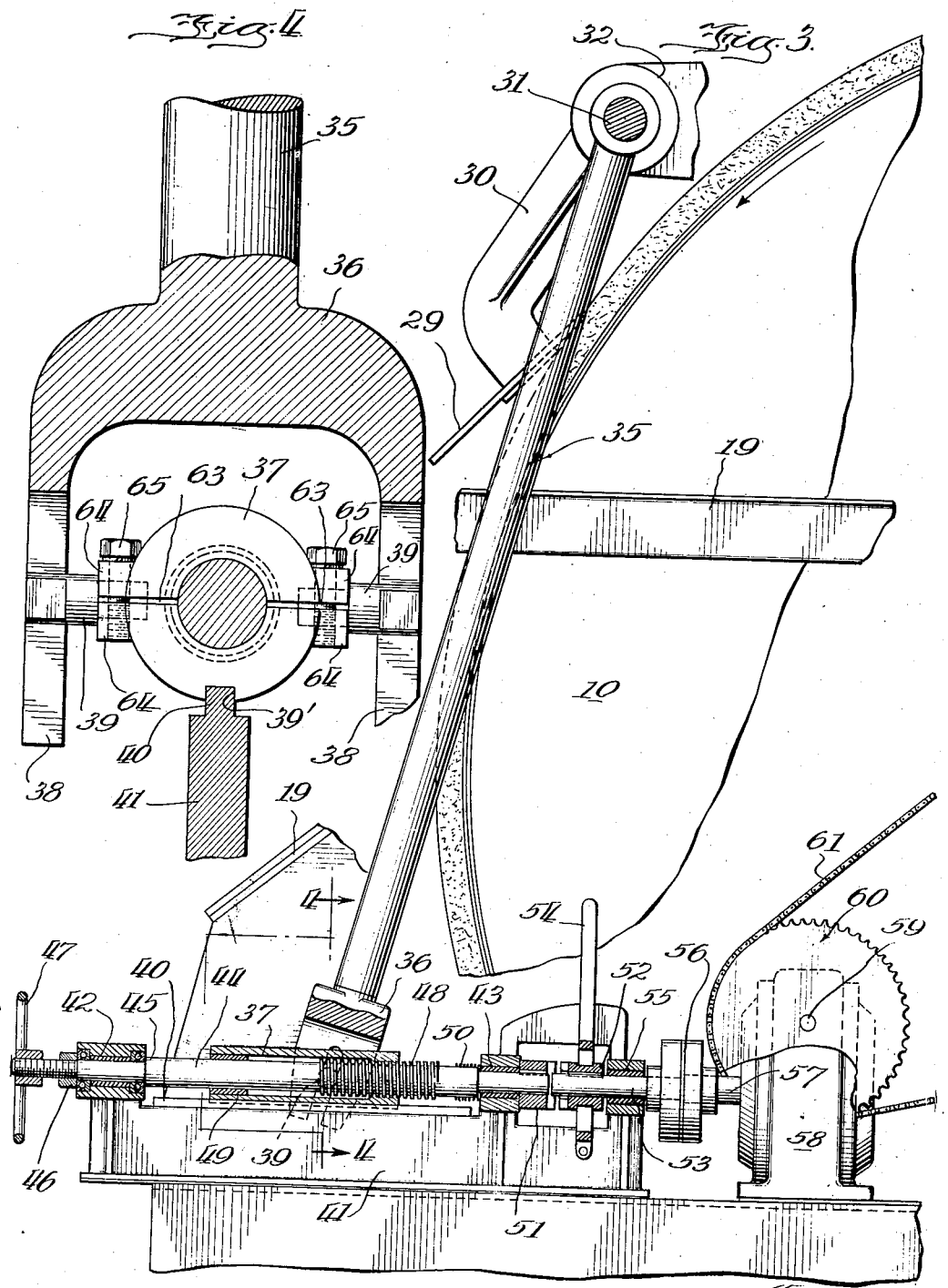

June 14, 1938.  A. J. BARNEBL  2,120,455
ROTARY FILTER
Filed Sept. 24, 1934  4 Sheets-Sheet 4

Inventor:
August J. Barnebl

Patented June 14, 1938

2,120,455

UNITED STATES PATENT OFFICE 2,120,455

ROTARY FILTER

August J. Barnebl, Chicago, Ill., assignor to Swenson Evaporator Company, Harvey, Ill., a corporation of Illinois Application September 24, 1934, Serial No. 745,201

13 Claims. (Cl. 210—201)

This invention relates to rotary filters and particularly to rotary filters which operate with a pre-coat applied to the filtering surface.

In operating such a filter, a pre-coat, in the form of a porous layer of suitable material is built up on the filtering surface and the liquid component of the material to be filtered is drawn through the pre-coat layer by means of vacuum applied to the inner side of the filtering surface, or is forced through the pre-coat layer by pressure applied from the outside. The solid components of the material to be filtered become deposited principally upon the outer surface of the pre-coat layer and after having been drained, for example, by the vacuum applied to the interior of the filtering surface at a point above the fluid level, this deposit, together with a slight thickness of the pre-coat, is shaved off by a knife or knives at a suitable location. In order to present a new pre-coat surface to the liquid being filtered, the knife or knives are progressively moved towards the filtering surface, and the present invention relates more particularly to mechanism for that purpose.

The present invention is hereinafter disclosed with reference to a rotary filter comprising a drum in which the filter surface is located around the cylindrical face of the drum. It will be understood, however, that the invention is not intended to be limited to this particular kind of rotary filter, since it may be applied with equal facility to any appropriate type of rotary filter.

The principal object of the present invention is to provide an improved rotary filter adapted to operate as a pre-coat filter.

A further object of the invention is to provide improved mechanism for operating the knife of a rotary filter so as to remove material from the filtering surface progressively nearer the same.

A further object of the invention is to provide an automatically and slowly actuated feed for the knife, in combination with a quick return actuating means for said knife.

A further object of the invention is to provide an improved knife which avoids excessive removal of the pre-coat layer from the filter.

Other objects, advantages and capabilities of the present invention will appear from the following disclosure of preferred embodiments thereof as applied to a rotary filter of the vacuum type.

In the drawings:

Figure 1 is an end elevational view of a rotary filter embodying my invention;

Fig. 2 is a side elevation thereof;

Fig. 3 is a fragmentary view showing the knife-actuating means in section;

Fig. 4 is a sectional detail on an enlarged scale, taken on the line 4—4 of Fig. 3;

Figure 5:
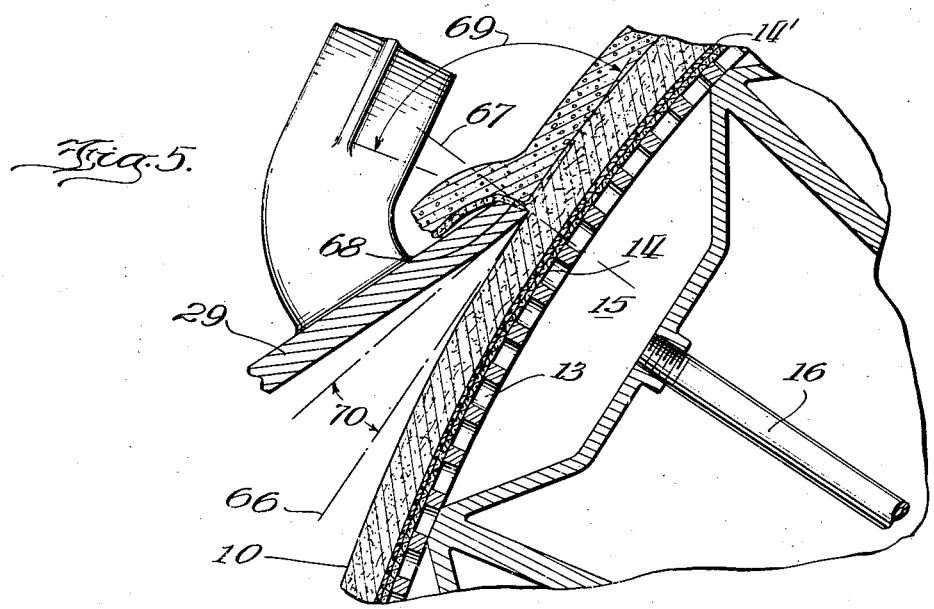
Fig. 5 is a sectional detail view through the knife and adjacent portion of the filter drum showing the preferred relation between the cutting edge of the knife and the drum.

Referring to Figs. 1 to 5 inclusive of the drawings, the reference numeral 10 indicates a filter drum of known type pivotally mounted for rotation by trunnions 11 and 12 on a horizontal axis. The cylindrical surface of the drum may suitably comprise a perforated wall 13 over which is applied a fine mesh screen 14, supporting and covered by a suitable fabric 14' as best shown in Fig. 5. On the inner side of the wall 13 are formed pockets 15 which communicate through pipes 16 with the trunnion 12. This trunnion is rotatably mounted in a bearing member 17 which is connected to a pipe 18 through which the liquid is withdrawn. Means (not shown) are provided for applying vacuum to the pipe 18 so as to draw liquid and air into pockets 15.

The drum 10 is adapted to rotate within a tank 19 which terminates short of the upper-most part of the filter drum. This tank 19 may suitably conform quite closely to the shape of the drum 10, as may be readily seen from Fig. 1.

The whole filter may suitably be supported upon foundation members 20, which carry a rectangular frame work 21 fabricated from steel beams. The bearing member 17 is supported from this frame work by means of brackets 22. Trunnion 11 is likewise supported from the frame 21 by a bearing 23. The trunnion 11 projects through the bearing member 23 into a housing 24 wherein it carries a worm gear 25. The drum 10 is rotated at a suitable speed by means of a worm 26 in mesh with the worm gear 25. The worm 26 is driven from a motor 27 through a gear reduction 28 and suitable driving connections shown diagrammatically in Fig. 1.

I provide a knife 29 for shaving off the solid material which is to be separated from the liquid, and also a small amount of pre-coat material. This knife is supported by a plurality of arms 30 which are rigidly mounted upon a horizontal bar 31. The horizontal bar 31 is mounted in bearings 32 on a transverse member 33. The transverse member 33 is located above the level of the tank 19 so that the knife 29 operates on the filter surface above the level of the tank, as shown in Fig. 1, and preferably on the downwardly moving side of the drum 10. It will readily be seen from Fig. 1 that any material shaved off the drum 10 by the knife 29 will pass over the surface of the knife 29 and fall clear of the tank 19. The transverse member 33 is supported at each end by a pair of legs 34, suitably of channeled members, which legs are rigidly secured to the frame 21.

At one end the bar 31 has rigidly secured thereto a lever 35 which extends downwardly toward the frame 21 and at its lower end is provided with a bifurcated member 36. The legs of the bifurcated member lie on each side of a nut 37. Each leg of the member 36 is provided with an axial slot 38 which receives a trunnion 39, these trunnions projecting laterally from the nut 37, as best shown in Fig. 4. The nut 37 is provided with a longitudinal key-way 39' which receives with a sliding fit a key 40 formed on a base 41. The base 41 is rigidly mounted on the frame 21, as best shown in Figs. 1 and 3. It is provided with bearings 42 and 43 for a shaft 44. The bearing 42 is a double-thrust bearing and the shaft 44 is held against longitudinal movement by means of a shoulder 45 formed thereon, and a nut 46 threadedly mounted on the reduced and threaded portion of the shaft on the other side of the bearing 42 from the shoulder 45.

At its outermost end the shaft 44 is provided with a manually operable wheel 47, whereby the shaft 44 may be rotated by hand. The shaft 44 is provided with a relatively long threaded portion 48 which is adapted to cooperate with a relatively short threaded portion of the nut 37. At the other end the nut 37 is provided with an internal sleeve or bushing 49 which receives the unthreaded portion of the shaft 44 with a free sliding fit.

A coil spring 50 is located around the shaft 44 between the threaded portion 48 and the bearing 43. When the shaft 44 is rotated from the filter during its operation, as will hereinafter be described, the nut 37 is moved progressively to the right, as viewed in Fig. 3, until the threaded portion of the nut runs off the threaded portion 48 of the shaft 44. Before this occurs the spring 50 comes into engagement with the nut 37 and prevents movement of the knife 29 into contact with the filter fabric 14' of the filter. Furthermore, the spring 50 keeps the threaded portion of the nut 37 against the threaded portion 48 of the shaft, and when the shaft 44 is rotated in the opposite direction, the nut 37 immediately screws on to the threaded portion 48.

On the other side of the bearing 43 from the spring 50 the shaft 44 has rigidly mounted thereon a clutch member 51. This clutch member is adapted to be engaged by a complementary clutch member 52 slidably mounted on, and keyed to a shaft 53 which is in alignment with the shaft 44. The clutch member 52 can be slid into and out of engagement with the clutch member 51 by means of a forked hand lever 54 which is pivotally mounted upon the base or casting 41. This casting also provides a bearing 55 for the shaft 53 and this shaft is connected by a suitable coupling 56 to the output shaft 57 of a gear reduction unit 58. The input shaft 59 of the gear reduction unit 58 carries a sprocket wheel 60 which is driven by a chain 61 which passes over the sprocket 62 on the trunnion 12. Because of the gear reduction unit 58, which may have any suitable ratio, the shaft 57 and, when the clutch lever 54 is in proper position, the shaft 44, may be made to rotate at the desired relatively slow speeds. Consequently, the nut 37 moves quite slowly and the knife 29 moves towards the filter fabric 14' at a very slow rate indeed. Ordinarily, it is preferred that the movement of the knife 29 towards the filtering surface of the drum should not exceed 0.005 inch per revolution of the drum.

The nut 37 is provided with diametrically opposite slots 63 which extend from one end of the nut through the threaded portion thereof. On each side of each slot 63 the nut 37 is provided with webs 64 through which extend screws 65.

It will readily be understood that any wear of the threaded portion of the nut or of the threaded portion 48 of the shaft 44 may be taken up by tightening the screws 65.

I have found that the shaving angles of the knife 29 are quite important. Thus referring to Fig. 5, the line 66 is tangent to the shaved surface while the line 67 indicates the radial direction at the point of shaving. For best results I have found that the angle between the tangent and the cutting surface 68 of the blade 29, that is, the angle 69 in Fig. 5, should be between 90 and 120 degrees. Preferably this angle should be as near 105 degrees as possible. The clearance angle, that is, the angle 70 which is the angle between the tangent 66 and the rear face at the cutting edge, should lie between 10 and 25 degrees. I prefer to make this angle as near 15 degrees as I can.

The operation of the filter will now be described. The present filter is intended primarily for use with a porous pre-coat. Suitable pre-coat materials are well known in the art and comprise foraminous or granular materials, such as some clays, fuller's earth, diatomaceous earth and the like. Whatever pre-coat is used, it is applied as a layer upon the filtering surface before the main filtering operation is started.

One manner in which this may be accomplished is to place a slurry of the pre-coat, that is, a suspension of the pre-coat in water, into the tank 19 and start the filter drum revolving by means of the motor 27 and the associated drive mechanism. At the same time vacuum is applied to the pipe 18, with the result that the liquid component of the slurry, usually water, is drawn through the filter fabric 14' and a layer of pre-coat is deposited on the surface of the fabric. This building up is continued until the desired depth of pre-coat is attained. For example, I may have a pre-coat of very substantial thickness, a typical pre-coat being about one or one and one-half inches deep. Before the pre-coat is formed upon the filtering surface of the filter drum, the knife 29 is backed up out of the way of the pre-coat. This is readily effected by throwing the clutch lever 54 into disengaged position and turning the shaft 44 by the hand wheel 47 so as to feed the nut 37 to the left, as viewed in Fig. 3. This movement is continued until the nut 37 hits against the bearing 42, or at least until sufficient clearance has been provided for a pre-coat of desired depth.

After the pre-coat is formed, the tank 18 may be drained and washed and then the material to be filtered is supplied thereto. The drum being in rotation owing to the operation of the motor 27, and the vacuum being applied to the interior of the filter fabric and the pre-coat layer, the liquid component of the material being filtered is withdrawn therethrough into the chambers 15 from which it passes through the pipe 16 to the outlet pipe 18.

A deposit of solid material is now built on top of the pre-coat layer. The knife 29 is now advanced towards the filtering surface of the drum, which may be effected by suitable rotation of the hand wheel 47 until the knife removes the coat of filtered material and preferably also a slight cut of pre-coat. Thereupon the clutch lever 54 is thrown into clutch engaging position and thereafter the knife 29 feeds progressively towards the filtering surface of the drum so as to remove the filtered solids and also to remove a very slight cut, preferably less than 0.005 inch of pre-coating during each revolution.

If desired, the pre-coat layer may be trued by advancing the knife to the necessary depth by the hand wheel 47, before the introduction of the material to be filtered.

As indicated above, the feeding of the knife 29 towards the filtering surface continues until the threaded portion of the nut 37 runs off the thread 48 of the shaft 44, whereupon the spring 50 prevents further advance of the knife 29 and the knife is automatically prevented from advancing far enough to contact the underlying fabric or drum. When this occurs, the nut 37 may be retracted by hand and a new pre-coat layer built up.

Figure 6:
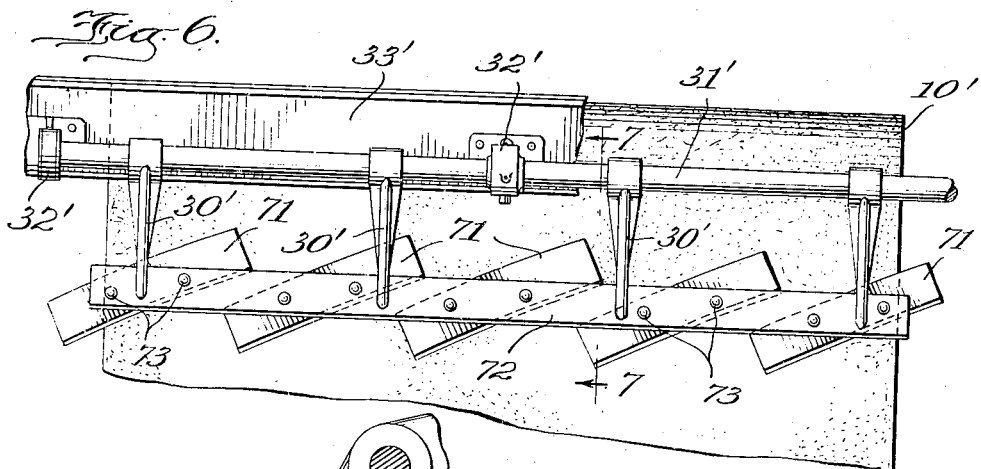
Fig. 6 is a fragmentary view showing a modified form of knife.
Figure 7:
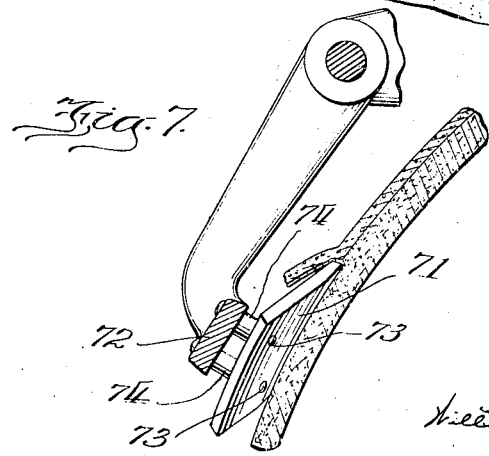
Fig. 7 is a sectional detail view taken on the line 7—7 of Fig. 6.

In the event that the pre-coat, because of its peculiar properties or for some other reason, tends to break up too far in advance of a single-bladed knife, this difficulty may be overcome by employing a scraper knife in the form of a multiplicity of blades, such as illustrated in Figs. 6 and 7, which act separately and independently of each other. Such blades are preferably located at an angle to the horizontal axis and formed to conform substantially to the curvature of the drum, which enables the cutting blades to operate with a side shear. The blades 71 may suitably be mounted on a transverse bar 72 by means of suitable rivets 73 and spacer washers 74. The bar 72 is suspended by means of a plurality of arms 30' from a bar 31'. The bar 31' is supported in bearings 32' on a transverse rigid structure 33'.

Having thus illustrated and described the nature and preferred embodiments of my invention, what I claim and desire to secure by United States Letters Patent is as follows:

1. A rotary filter having a knife adapted to swing towards the filtering surface, a shaft adapted to be driven with the filter, a nut on said shaft from which the knife is actuated, means for disconnecting the drive of the shaft, and manual means for the quick return of the nut and knife to their original positions.

2. A rotary filter having a knife adapted to be fed towards the filtering surface, a shaft, drive means connected to the filter for rotating said shaft, means associated with the shaft for effecting gradual feed of the knife towards the filtering surface as the filter rotates, a clutch in said drive means, and manual means for rotating said shaft in the opposite direction to retract the knife when the clutch is disengaged.

3. A rotary filter having a drum with a cylindrical filter surface, a drive for rotating the drum, a knife extending across said surface adapted to remove deposits therefrom, a bar rotatably mounted above said knife, a plurality of tension arms rigidly secured to said bar and to said knife, and means operatively connected to the drive of the filter drum for causing gradual and continuous approach of the knife to the filter surface as the filter rotates.

4. A rotary filter having a knife adapted to swing towards the filtering surface, a slowly driven rotatable member controlling the gradual approach of the knife to the filtering surface, a drive for said rotatable member including a speed reduction unit whereby said rotatable member is caused to rotate relatively slowly, a clutch between said speed reduction unit and said rotatable member, and means for rotating said member rapidly in the opposite direction to retract the knife from the filtering surface.

5. A filter having a rotary drum, the cylindrical wall being the filtering surface, a knife extending across said surface and pivotally suspended for actuation towards the filtering surface at a very gradual rate, means for actuating said knife comprising a rotary shaft, a nut threaded thereon, means for preventing rotation of the nut, means operatively connecting said knife and nut, drive means including a speed reduction unit and a clutch between the drum and the shaft, and a hand-wheel on the shaft for rapidly rotating the shaft and returning the knife to original position.

6. A filter having a rotary drum, the cylindrical wall being the filtering surface, a knife extending across said surface, a bar rotatably mounted in stationary bearings, a series of arms extending from said bar and carrying the knife rigidly on said bar, a lever having a forked lower end, rigidly mounted on one end of said bar and extending downwardly therefrom, a nut held against rotation and having means operatively engaging said forked end, a shaft on which said nut is threadedly mounted, said shaft being rotatably mounted and being held against longitudinal movement, a drive for said shaft comprising means driven from the drum, a speed reduction unit and a clutch, the clutch being located between the reduction unit and the shaft, and a hand-wheel on said shaft whereby the knife may be backed up rapidly after the clutch is disengaged.

7. A rotary filter having a filtering surface, a knife cooperating with said surface and adapted to approach same gradually during the operation of the filter, a nut controlling the actuation of said knife, a threaded shaft carrying said nut, means preventing rotation of said nut, means preventing longitudinal movement of said shaft, a drive for said shaft operatively connected to the rotating element of the filter, said nut comprising a threaded portion which is slotted, and adjustable means for drawing the separated portions of the nut together to take up wear and prevent vibratory movements of the knife.

8. A rotary filter having a filtering surface, a knife unit for removing deposits from said surface, and actuating means for progressively moving the knife unit towards the filtering surface including cooperating threaded elements adapted to disengage to avoid driving the knife into contact with the filtering surface.

9. A rotary filter having a filtering surface, a knife unit for removing deposits from said surface, a driving element operatively connected to the rotary filter element to be rotated thereby, a second driving element having a threaded connection with the first said driving element, means holding second said driving element against rotation, means operatively connecting second said element to the knife unit whereby said unit is moved progressively towards the filtering surface as the rotary filter element rotates, said driving elements being arranged to come out of threaded connections to prevent the knife unit being moved into contact with the filtering surface, and means holding said knife unit out of contact with said surface.

10. A rotary filter having a rotatable element provided with a filtering surface, a knife unit having a knife adapted to remove deposit from said surface, said unit being adapted for movement to cause the knife gradually to approach said surface, a shaft having a threaded portion, a nut member thereon for moving said unit to a predetermined position with the knife adjacent said surface, and a spring on the shaft holding said nut against the threaded portion.

11. A rotary filter having a rotatable element provided with a filtering surface, a knife unit having a knife adapted to remove deposit from said surface, a threaded element operatively connected to said knife unit, a complementary threaded element adapted to be rotated to cause the knife unit to approach the filtering surface, said threaded elements being adapted to disengage before the knife unit contacts the filtering surface, and a spring acting on the last said threaded element to cause the threads to re-engage when the direction of rotation of the first said threaded element is reversed.

12. A rotary filter having a knife adapted to feed towards the filtering surface, a shaft adapted to be driven with the filter, a nut on said shaft from which the knife is actuated, means for disconnecting the drive of the shaft, and manual means for the quick return of the nut and knife to their original positions.

13. A rotary filter having a knife adapted to feed toward the filtering surface, a slowly driven rotatable member controlling the gradual approach of the knife to the filtering surface, a drive for said rotatable member including a speed reduction unit whereby said rotatable member is caused to rotate relatively slowly, a clutch between said speed reduction unit and said rotatable member, and means for rotating said member rapidly in the opposite direction to retract the knife from the filtering surface.

AUGUST J. BARNEBL.